(12) United States Patent
Assem Aly Salama et al.

(10) Patent No.: US 11,113,629 B2
(45) Date of Patent: *Sep. 7, 2021

(54) ADAPTIVE CONFIGURATION OF A HETEROGENEOUS CLUSTER ENVIRONMENT

(71) Applicant: International Business Machines Corporation, Armonk, NY (US)

(72) Inventors: Hitham Ahmed Assem Aly Salama, Dublin (IE); Teodora Sandra Buda, Dublin (IE); Faisal Ghaffar, Dunboyne (IE); Lei Xu, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 560 days.

This patent is subject to a terminal disclaimer.

(21) Appl. No.: 15/859,542

(22) Filed: Dec. 31, 2017

(65) Prior Publication Data
US 2019/0050754 A1 Feb. 14, 2019

Related U.S. Application Data

(63) Continuation of application No. 15/675,925, filed on Aug. 14, 2017.

(51) Int. Cl.
*G06N 20/00* (2019.01)
*H04L 12/24* (2006.01)
*G06N 5/00* (2006.01)

(52) U.S. Cl.
CPC ............. *G06N 20/00* (2019.01); *G06N 5/003* (2013.01); *H04L 41/0886* (2013.01);
(Continued)

(58) Field of Classification Search
CPC .... G06N 20/00; G06N 5/003; H04L 41/0886; H04L 41/145; H04L 41/16; H04L 41/24; H04L 41/0803
See application file for complete search history.

(56) References Cited

U.S. PATENT DOCUMENTS 7,548,892 B2 6/2009 Buck et al.
7,694,117 B2 4/2010 Kilian et al.
(Continued)

FOREIGN PATENT DOCUMENTS

CN 103617146 A 3/2014

OTHER PUBLICATIONS

Evan Sparks et al., Automating Model Search for Large Scale Machine Learning, SoCC '15 Proceedings of the Sixth ACM Symposium on Cloud Computing pp. 368-380, ACM Digital Library, Aug. 27-29, 2015, Kohala Coast, HI, USA.
(Continued)

*Primary Examiner* — Li Wu Chang
(74) *Attorney, Agent, or Firm* — Samuel Waldbaum; Otterstedt, Wallace & Kammer, LLP

(57) ABSTRACT

An embodiment includes a method for use in managing a system comprising one or more computers, each computer comprising at least one hardware processor coupled to at least one memory, the method comprising a computer-implemented manager: generating a potential configuration for hardware resources of the system; determining whether the potential configuration satisfies accuracy and time constraints for a selected machine learning model; if the potential configuration satisfies the constraints, indicating the potential configuration to be the optimal configuration for the system; and if the potential configuration does not satisfy the constraints, adapting the potential configuration to satisfy the constraints. The adapting may comprise repeating the generating and determining steps. The adapting may be based at least in part on the hardware resources and the selected machine learning model.

19 Claims, 4 Drawing Sheets

(52) U.S. Cl.
CPC ............ *H04L 41/145* (2013.01); *H04L 41/16* (2013.01); *H04L 41/24* (2013.01); *H04L 41/0803* (2013.01)

(56) References Cited

U.S. PATENT DOCUMENTS

| | | | |
|---|---|---|---|
| 8,200,610 B1 | 6/2012 | Birch et al. | |
| 2010/0131734 A1* | 5/2010 | Clegg | G06F 9/44505 |
| | | | 711/170 |
| 2010/0223218 A1* | 9/2010 | Prendergast | G06N 20/00 |
| | | | 706/20 |
| 2015/0242760 A1 | 8/2015 | Miao et al. | |
| 2015/0253463 A1 | 9/2015 | Narayanaswamy et al. | |
| 2015/0324685 A1 | 11/2015 | Bohn et al. | |
| 2015/0379429 A1* | 12/2015 | Lee | G09B 5/00 |
| | | | 706/11 |
| 2016/0188474 A1 | 6/2016 | Wang et al. | |
| 2016/0300156 A1 | 10/2016 | Bowers et al. | |
| 2018/0046926 A1* | 2/2018 | Achin | G06N 20/00 |

OTHER PUBLICATIONS

Hitham Ahmed Assem Aly Salama et al., unpublished U.S. Appl. No. 15/675,925, filed Aug. 14, 2017, Adaptive Configuration of a Heterogeneous Cluster Environment, pp. 1-18 plus 4 sheets of drawings.

Paul J. Otterstedt, List of IBM Patents or Patent Applications Treated as Related, Jun. 25, 2018, pp. 1-2.

* cited by examiner

100

400

ADAPTIVE CONFIGURATION OF A HETEROGENEOUS CLUSTER ENVIRONMENT

CROSS-REFERENCE TO RELATED APPLICATIONS

This application is a continuation of U.S. patent application Ser. no. 15/675,925 filed Aug. 14, 2017, the complete disclosure of which is expressly incorporated herein by reference in its entirety for all purposes

BACKGROUND

The present invention relates to the electrical, electronic and computer arts, and, more particularly, to management of one or more computer systems.

Machine learning represents the study of pattern recognition and computational learning theory in artificial intelligence, which involves learning from data to support actions or decisions. The potential application areas of machine learning are vast: for instance, machine learning models can be used for predicting an event, for classifying an object, or for recommending an item to a consumer.

A machine learning system generally refers to a system that utilizes a machine learning model to learn from past experiences (i.e., historical data) and infer insightful information in order to make a decision. In this context, machine learning involves the design and development of various models to solve a particular business problem or to make a decision.

A typical offline machine learning process involves two phases: (i) training a model, using training or historical data, and (ii) scoring using the trained model from the previous step on real-life or future data. In particular from these, the training phase of the machine learning model requires computationally advanced systems to allow the training on a very large dataset in order to achieve certain higher accuracy.

For any machine learning model that supports a business decision, two aspects are critical: (1) the accuracy of the model and (2) the elapsed time of the learning phase. The accuracy of the model is crucial as the business decision supported by that particular model can be critical for the organization. In this case, the accuracy of machine learning model is directly proportional to the accuracy of the business decision. Similarly, the time required by a model to be trained or learn can lead to time-consuming business decisions. The less time the model takes to learn, the quicker it can support a business decision.

In order to meet these constraints, machine learning models require training in a computationally advanced environment with a specific set of hardware resources and settings. The required hardware resources need to be pre-configured in order to train a specific machine learning model with certain time and accuracy constraints. In this context, hardware resources refer to either one or multiple servers in a heterogeneous cluster. Configuring these resources is non-trivial and implies setting up the environment in such a way that it can be efficiently used for training the machine learning model.

SUMMARY

A method for use in managing a system comprising one or more computers, each computer comprising at least one hardware processor coupled to at least one memory, the method comprising a computer-implemented manager: generating a potential configuration for hardware resources of the system; determining whether the potential configuration satisfies accuracy and time constraints for a selected machine learning model; if the potential configuration satisfies the constraints, indicating the potential configuration to be the optimal configuration for the system; and if the potential configuration does not satisfy the constraints, adapting the potential configuration to satisfy the constraints. The adapting may comprise repeating the generating and repeating steps. The adapting may be based at least in part on the hardware resources and the selected machine learning model.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Embodiments of the invention advantageously reduce the time required and minimize the human error in configuring the machine learning system within a given set of hardware resources, model training time and accuracy constraints. Embodiments of the invention can reduce the time needed to configure hardware resources (e.g., cluster environment) when applying a machine learning model to achieve a certain accuracy of the model. Also, embodiments of the invention make the entire system configuration process less susceptible to error by providing an automated process of configuring resources which leads to less human intervention and hence lower chances of error. By finding an optimal configuration, embodiments of the invention ensure a more efficient resource utilization due to less resource wastage. By finding an optimal configuration once, and then reusing it for other hardware resources in similar settings, methods described in this invention save energy when resources are reconfigured.

These and other features and advantages of the present invention will become apparent from the following detailed description of illustrative embodiments thereof, which is to be read in connection with the accompanying drawings.

DETAILED DESCRIPTION

Embodiments of the invention facilitate adapting a virtualized configuration of given fixed hardware resources to optimize the time efficiency for training a machine learning model with a certain accuracy and within a certain time. One aspect of the invention may include considering the given hardware resources to implement a machine learning model, and the time and accuracy requirements of the machine learning model and it will attempt to find an optimized configuration for that model. Thus, embodiments of the invention may consider a given machine learning model, its accuracy required by application/user, and time constraints to train the machine learning model and then identify optimized virtual configurations for fixed hardware resources. Another aspect of the invention may include saving and adapting the optimized configuration specifications for the given hardware resources in another machine learning environment.

As used herein, a "configuration" generally refers to the manner in which a system is configured to train a machine learning model with certain accuracy and time. A configuration may involve one or more files. A configuration may include but not limited to system settings such as system name, hardware architecture, number of CPUs (central processing units), RAM (random-access memory) size, storage capacity, operating system, and network configurations. In addition to these system settings, a configuration may also include dependent variables necessary to train the machine learning model.

In the case of a virtualized environment, configuration could include configuring one or more virtual machines in terms of, e.g., number of CPUs, size of RAM, storage capacity, operating system, hardware architecture, network settings etc. Configuration may also include tweaking the existing hardware of system in a specific setting to train a machine learning model. The objective in all settings is to configure an environment that can be used to train a machine learning model within a given time with a certain accuracy.

Figure 1:
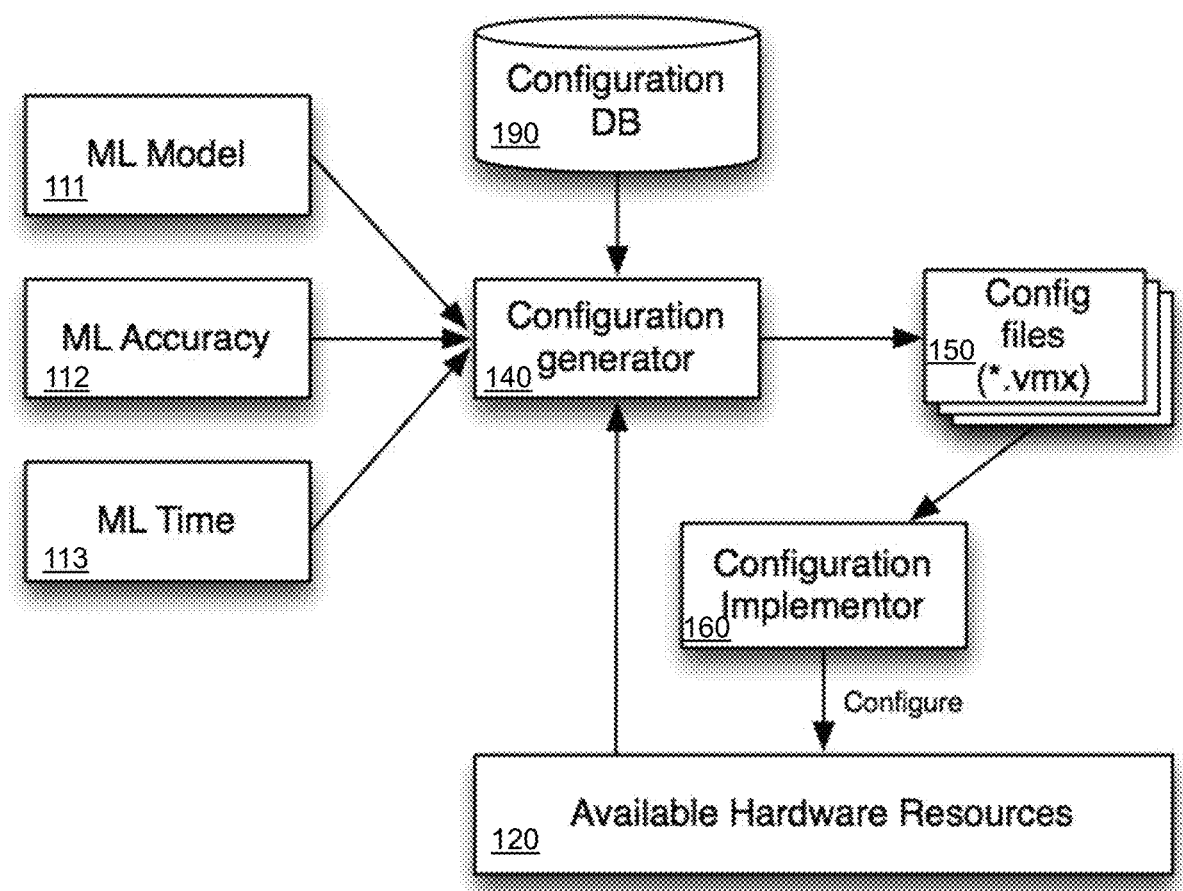
FIG. 1 is a combined block/flow diagram showing one or more aspects of an illustrative embodiment of the present invention.

FIG. 1 is a combined block/flow diagram showing one or more aspects of an illustrative embodiment 100 of the present invention. This embodiment 100 may be operative to find a suitable configuration for given hardware resources considering the time and accuracy requirements to train a machine learning model. Embodiment 100 includes a configuration generation module 140 and a configuration implementation module 160.

Configuration generation module 140 looks at the available hardware resources 120 and considers the machine learning (ML) model 111 along with other requirements such as model accuracy 112 and time efficiency 113. Configuration generation module 140 then creates a number of possible configuration settings 150 for the hardware resources, including system settings such as number of CPUs, RAM size, disk size, operating system and any other settings required to configure the hardware resources.

Configuration generation module 140 may use virtualization tools to create multiple virtualized configurations 150 based on various settings of number of CPUs, storage capacity and operating system for given hardware resources. Examples of virtualization tools suitable for use with an embodiment of the invention include KVM (Kernel-based Virtual Machine) or HashiCorp Vagrant. For example, one configuration created by module 140 may contain 2 CPUs with some disk size and another configuration may contain 4 Quad Core CPUs depending on the available resources.

The configurations 150 created by module 140 may follow a virtual machine file format (e.g., vmx). Configuration generator module 140 can save those created configurations in a database 190 so that these configurations can be retrieved by other modules when deploying the configuration in another environment.

Configuration implementation module 160 is responsible for finding the optimal configuration for the given hardware resources. Module 160 is preferably attached to a configuration recipient system (i.e., the system used for training the machine learning model) in order to adapt its hardware resources to their optimal configuration. Module 160 may take as inputs the hardware resources of the recipient system 120 as well as the machine learning model 111 and it will select the best possible configuration 150 from the configuration database 190. Module 160 will then configure the recipient system with the selected configuration for a given machine learning model.

Figure 2:
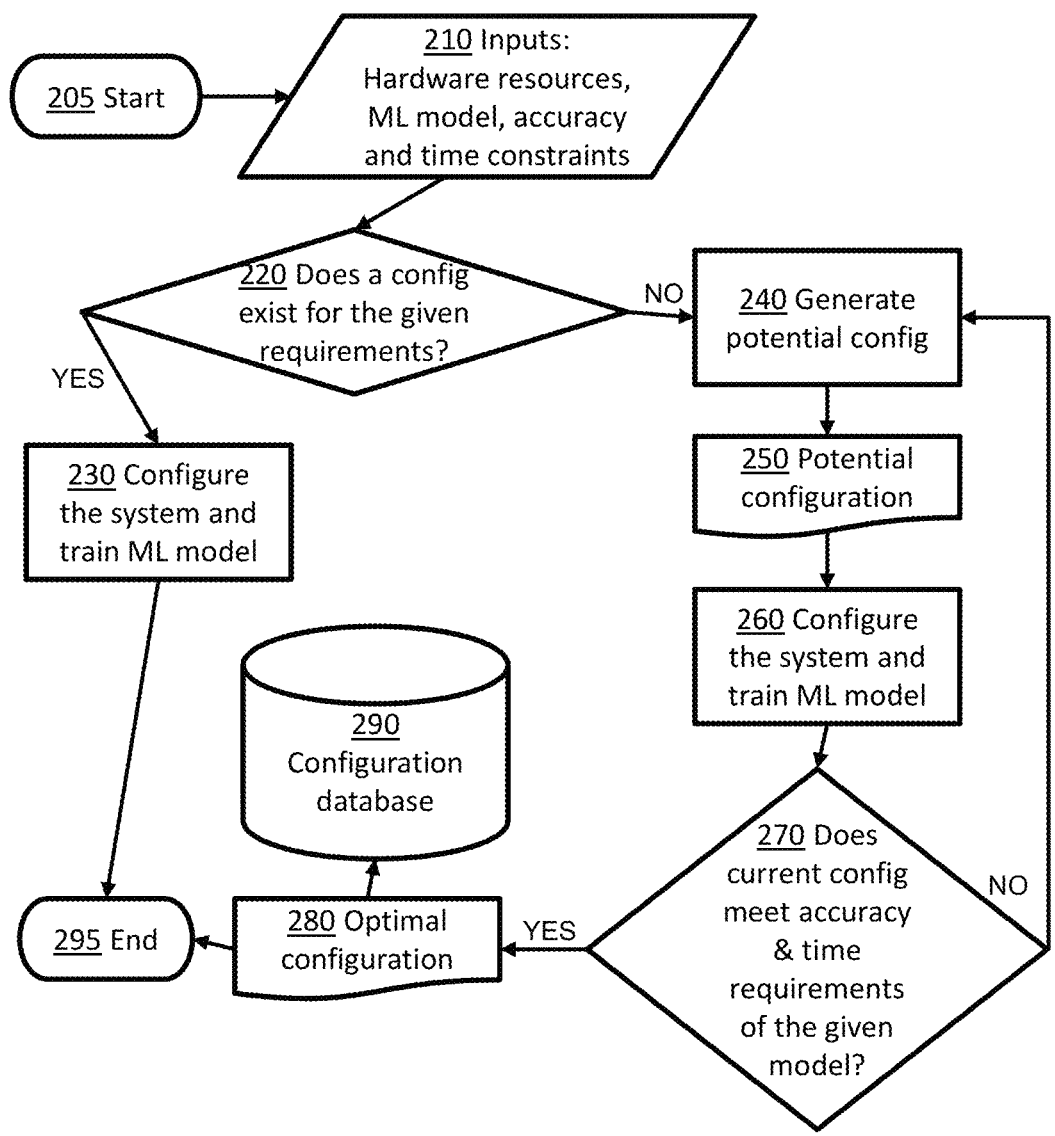
FIG. 2 is a simplified flowchart showing one or more aspects of an illustrative embodiment of the present invention.

FIG. 2 is a flowchart showing one or more aspects of an illustrative embodiment 200 of the present invention. Process 200 shown in FIG. 2 may be executed on system 100 shown in FIG. 1 (e.g., including modules 140 and 160). However, system 100 could use a different method, and method 200 could use a different system.

Process 200 starts 205 with inputs 210. Inputs 210, which may be provided to configuration generation module 140, may include hardware resources 120, machine learning model 111, accuracy constraints 112, and time constraints 113. In step 220, configuration generation module 140 checks to see if any configuration exists in the configuration database (130 in FIG. 1 and/or 290 in FIG. 2) for the given set of inputs 210 (e.g., the given set of hardware resources 120, machine learning model 111, accuracy constraints 112, and time constraints 113).

If an optimal configuration file already exists for the given set of inputs 210 (YES branch of step 220), then the process goes to step 230, where the configuration implementation module 160 configures the system according to the optimal configuration. Also in step 230, the machine learning model is then trained on the configured hardware resources. The process then ends 295.

If no previous optimal configuration file exists for the given set of inputs 210 (NO branch of step 220), then the process goes to step 240, where the configuration generation module 140 generates a possible configuration file (150 in FIG. 1 and/or 250 in FIG. 2) with various combinations of hardware resource settings such as number of CPUs, disk size, and operating system, etc.

The process continues to step 260, which is similar in some aspects to step 230 discussed above. The configuration implementation module 160 configures the system according to the configuration 250 generated in step 240. Also in step 260, the machine learning model is then trained on the configured hardware resources. In step 260, the time required for training and the accuracy reached are recorded.

Step 270 determines whether configuration 250 satisfies the accuracy constraints 112 and time constraints 113 provided in step 210. If these constraints are not satisfied (NO branch of step 270), the method returns to step 240 where another potential configuration is generated. If the constraints are satisfied (YES branch of step 270), the configuration is deemed to be an optimal configuration 280 and is saved to the configuration database 290 with a unique name.

Figure 3:
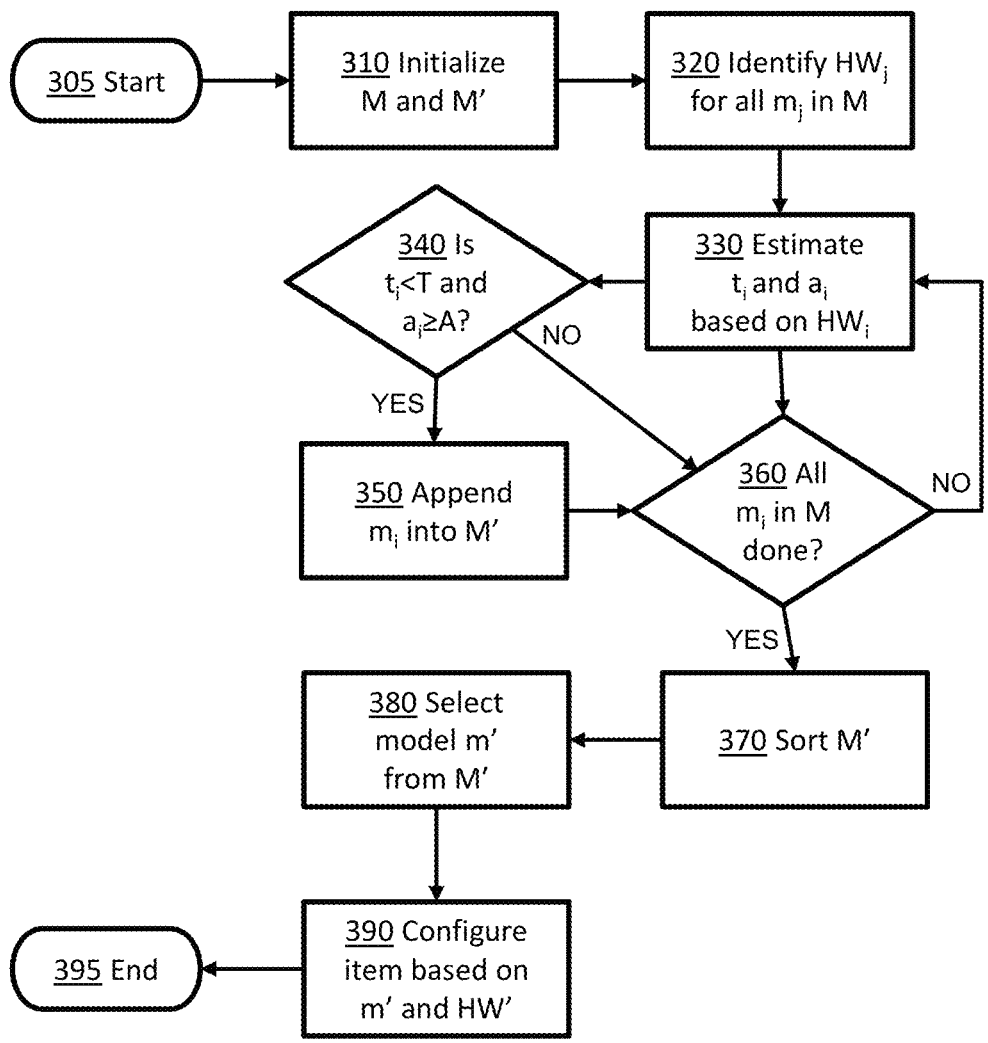
FIG. 3 is a simplified flowchart showing a procedure useful in connection with one or more aspects of an illustrative embodiment of the present invention.

FIG. 3 is a flowchart showing a procedure 300 suitable for use in an illustrative embodiment of the present invention. For example, FIG. 3 could be useful when performing steps 250 through 280 shown in FIG. 2.

In one embodiment, FIG. 2 could be useful where the machine learning model is preselected, and the challenge is to find an optimal configuration for that model under the constraints of hardware resources and machine learning model. By contrast, FIG. 3 could be useful to select a specific machine learning model from a set of available machine learning models. For example, FIG. 3 could be used to determine which machine learning model is optimal in terms of the required accuracy and time constraint when deployed on given hardware resources.

In FIG. 3: T denotes the time-constraint of the machine learning (ML) business problem (e.g., 112 in FIG. 1). A denotes the required accuracy of the ML model for the business problem (e.g., 113 in FIG. 1). $m_i$ denotes an arbitrary given machine learning (ML) model (e.g., 250 in FIG. 2) that needs to be trained and whose computational complexity is $O(m_i)$. $t_i$ denotes the time spent by $m_i$ with accuracy of $a_i$. $HW_i$ denotes the hardware settings such that when a given hardware is configured with $HW_i$, it minimizes the $t_i$ of ML model $m_i$ when deployed on $HW_i$. $M=\{m_1, m_2, m_3 \ldots\}$ denotes all the ML models that can be applied to identify optimal HW'. M' is a list of selected ML models to solve the problem.

Procedure 300 begins in step 305. In step 310, M and M' are initialized. As previously noted, $M=\{m_1, m_2, m_3 \ldots\}$ and denotes the available ML models. M' is initialized to be empty (M'=∅). In step 320, $HW_j$ is identified for all $m_j$ in M ($\forall m_j \in M$) based on available hardware.

Step 330 begins a loop (further discussed below with reference to step 360) which insures that steps 330 and 340 are repeated for all $m_i$ in $M(\forall m_i \in M)$. For example, these steps may be performed first on $m_1$ then on $m_2$ and then on $m_3$ with i being incremented for each iteration.

In step 330, $t_i$ and $a_i$ are estimated based on $HW_i$. Step 340 checks to whether that the time and accuracy constraints are met: is $t_i<T$ and $a_i \geq A$? If so, the procedure performs step 350, in which $m_i$ is appended into M', before proceeding to step 360. If not, the procedure skips step 350 and proceeds directly to step 360.

Step 360, determines whether the loop comprising steps 330 and 340 has been performed for all $m_i$ in M ($\forall m_i \in M$). If not, the procedure returns to step 330 in order to process the next $m_i$ in M, which may involve incrementing a value of i in successive iterations as discussed above. If so, the procedure proceeds to step 370.

In step 370, M' is sorted. In some embodiments, M' is sorted based on both time spent and computational complexity. By way of example, M' could be sorted wherein $O(m_j) \leq O(m_{j+1})$ for all $m_j$ and $m_{j+1}$ in M' ($\forall m_j, \forall m_{j+1} \in M'$) if $j \geq 1$ and $j|1 \leq k$, where k is the total number of models in set M'. In step 380, corresponding to line 411, a model m' is selected from M'. Because M' was sorted in step 370, it may be desirable to use the first model in M' as m'.

In step 390, corresponding to line 412, an item (e.g., computer, cluster, etc.) is configured based on m' (e.g., 280 in FIG. 2) and HW' which is the optimal hardware configuration corresponding to m'. For example, if $m_i$ is selected as m', then HW' will be $HW_i$. The procedures ends in step 395.

Given the discussion thus far, it will be appreciated that, in general terms, an aspect of the invention includes a method for use in managing a system comprising one or more computers, each computer comprising at least one hardware processor coupled to at least one memory. The method comprises a computer-implemented manager: generating a potential configuration for hardware resources of the system; determining whether the potential configuration satisfies accuracy and time constraints for a selected machine learning model; if the potential configuration satisfies the constraints, indicating the potential configuration to be the optimal configuration for the system; and if the potential configuration does not satisfy the constraints, adapting the potential configuration to satisfy the constraints. The adapting may comprise repeating the generating and repeating steps. The adapting may be based at least in part on the hardware resources and the selected machine learning model.

One or more embodiments of the invention, or elements thereof, can be implemented, at least in part, in the form of an apparatus including a memory and at least one processor that is coupled to the memory and operative to perform exemplary method steps.

Figure 4:
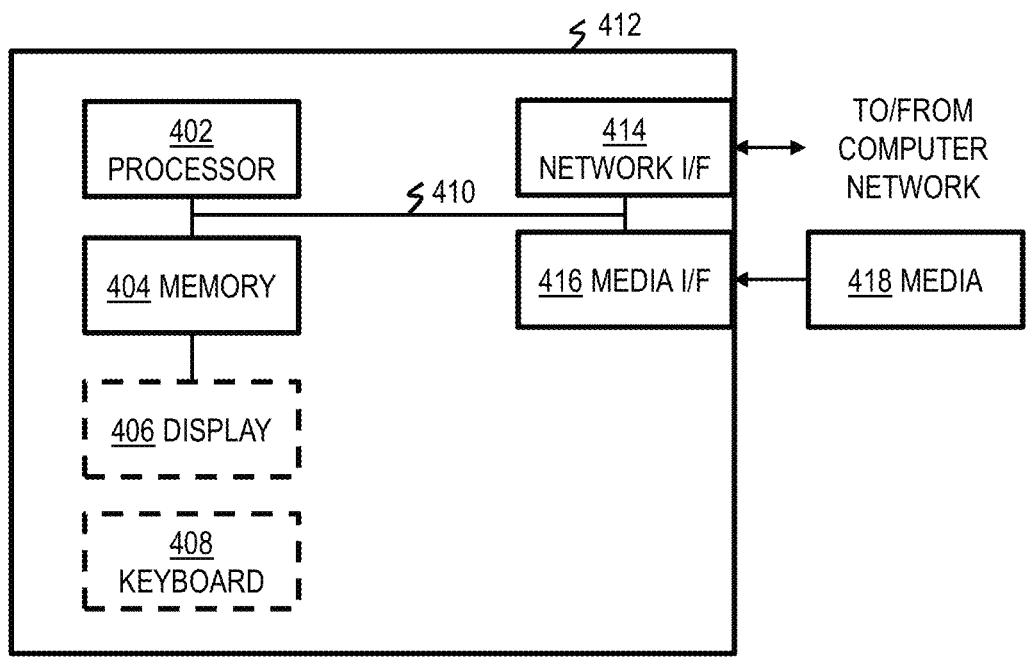
FIG. 4 depicts a computer system that may be useful in implementing one or more aspects and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for use in managing a system comprising one or more computers, each computer comprising at least one hardware processor coupled to at least one memory, the method comprising a computer-implemented manager:
    generating a plurality of potential configurations for hardware resources of the system for each of a plurality of machine learning models;
    determining, for each of the plurality of machine learning models, the potential configuration of the plurality of potential configurations that exhibits a minimal execution time while satisfying accuracy and time constraints for the corresponding machine learning model, wherein the determining step comprises configuring the system according to a selected potential configuration, training the corresponding machine learning model on the configured system, and recording time required for training and accuracy reached;
    sorting, based on execution time to train the corresponding machine learning model of the plurality of machine learning models, the plurality of machine learning models and corresponding plurality of potential configurations that exhibit the minimal execution time; and
    configuring at least a subset of the hardware resources based on an optimal machine learning model of the plurality of sorted machine learning models.

2. The method of claim 1, wherein the determining is based at least in part on the hardware resources and a selected machine learning model.

3. The method of claim 1, further comprising the step of, once a selected potential configuration is indicated to be the optimal configuration for the system, configuring the system according to the optimal configuration.

4. The method of claim 1, further comprising the step of, once a selected potential configuration is indicated to be the optimal configuration for the system, saving the optimal configuration for the system to a configuration database.

5. The method of claim 4, further comprising the step of, if the configuration database includes a saved optimal configuration for the system, configuring the system according to the optimal configuration without generating additional potential configurations.

6. The method of claim 5, wherein configuring the system according to the optimal configuration comprises training the machine learning model on the configured system.

7. The method of claim 1, wherein the determining step comprises utilizing a selected potential configuration to estimate time required for training the machine learning model.

8. The method of claim 1, wherein a selected potential configuration for the system is generated based at least in part on a fixed set of available hardware resources.

9. The method of claim 1, further comprising selecting the machine learning model from a set of available machine learning models.

10. The method of claim 9, further comprising configuring the system based at least in part on the selected model and the optimal configuration for the selected model.

11. The method of claim 9, wherein the machine learning model is selected based at least in part on the accuracy and time constraints for the machine learning model.

12. The method of claim 9, wherein selecting the machine learning model from the set of available machine learning models comprises:
    determining a subset of the set of models which satisfies accuracy and time constraints; and
    selecting at least one of the subset which satisfies the constraints.

13. The method of claim 12, wherein the optimal configuration for the given model minimizes a training time of the given model relative to one or more other configurations.

14. The method of claim 13, wherein determining whether at least the given one of the set of available models satisfies accuracy and time constraints comprises estimating the training time of the given model based on the optimal configuration for the given model.

15. The method of claim 12, wherein selecting at least one of the subset which satisfies the constraints comprises the step of selecting the at least one model based at least in part on its position within the plurality of sorted machine learning models.

16. The method of claim 15, wherein the plurality of sorted machine learning models is sorted based at least in part on computational complexity.

17. The method of claim 15, wherein the plurality of sorted machine learning models is sorted based at least in part on training time.

18. The method of claim 15, wherein the plurality of sorted machine learning models is sorted based on both computational complexity and training time.

19. The method of claim 1, wherein at least one of the potential configurations for hardware resources is defined in a virtualized environment and comprises one or more virtual machines having a specified number of virtual central processing units, RAM and storage capacity of a specified size, a specified operating system, a specified hardware architecture, and specified network settings.

* * * * *